United States Patent [19]

Frederick et al.

[11] Patent Number: 4,600,235

[45] Date of Patent: Jul. 15, 1986

[54] JEEP TOP FASTENING MEANS

[75] Inventors: Dennis R. Frederick; Ronald E. Setter, both of Colorado Springs, Colo.

[73] Assignee: White Automotive Corporation, Colorado Springs, Colo.

[21] Appl. No.: 646,686

[22] Filed: Aug. 30, 1984

[51] Int. Cl.[4] .............................................. B62D 25/06
[52] U.S. Cl. ................................ 296/106; 296/84 M; 296/141; 160/290 R; 160/368 R; 160/DIG. 8; 160/DIG. 10
[58] Field of Search ............... 296/138, 140, 141, 102, 296/106, 78 R, 83, 84 M, 98, 143, 50; 160/DIG. 8, DIG. 18, 368 R, 368 S, 354, 290 R, DIG. 2, DIG. 10

[56] References Cited

U.S. PATENT DOCUMENTS

| | | | |
|---|---|---|---|
| 1,538,759 | 5/1925 | Thomas | 296/138 |
| 1,894,527 | 1/1933 | Yengst | 296/138 |
| 2,352,609 | 7/1944 | Bates | 160/290 R |
| 2,463,646 | 3/1948 | Schassberger | 296/102 X |
| 2,537,611 | 1/1951 | Walton | 160/368 R |
| 3,167,349 | 1/1965 | Young et al. | 296/102 X |
| 3,391,724 | 7/1969 | Charlesworth | 160/368 S |
| 3,958,826 | 5/1976 | Upton | 296/143 X |
| 4,179,152 | 12/1979 | Kent, Jr. | 296/141 X |

*Primary Examiner*—Robert B. Reeves
*Assistant Examiner*—Russell D. Stormer
*Attorney, Agent, or Firm*—Sheridan, Ross & McIntosh

[57] ABSTRACT

Apparatus is provided for covering and uncovering an opening in the rear of an automobile wherein the apparatus comprises a tailgate pivotally mounted for rotation about a vertical axis and covering or uncovering the lower portion of the opening and a separate flexible member detachably secured to the rear of the automobile to cover or uncover the remaining portion of the opening so that the tailgate may be moved to uncover the lower portion of the opening without moving any portion of the separate flexible member.

22 Claims, 2 Drawing Figures

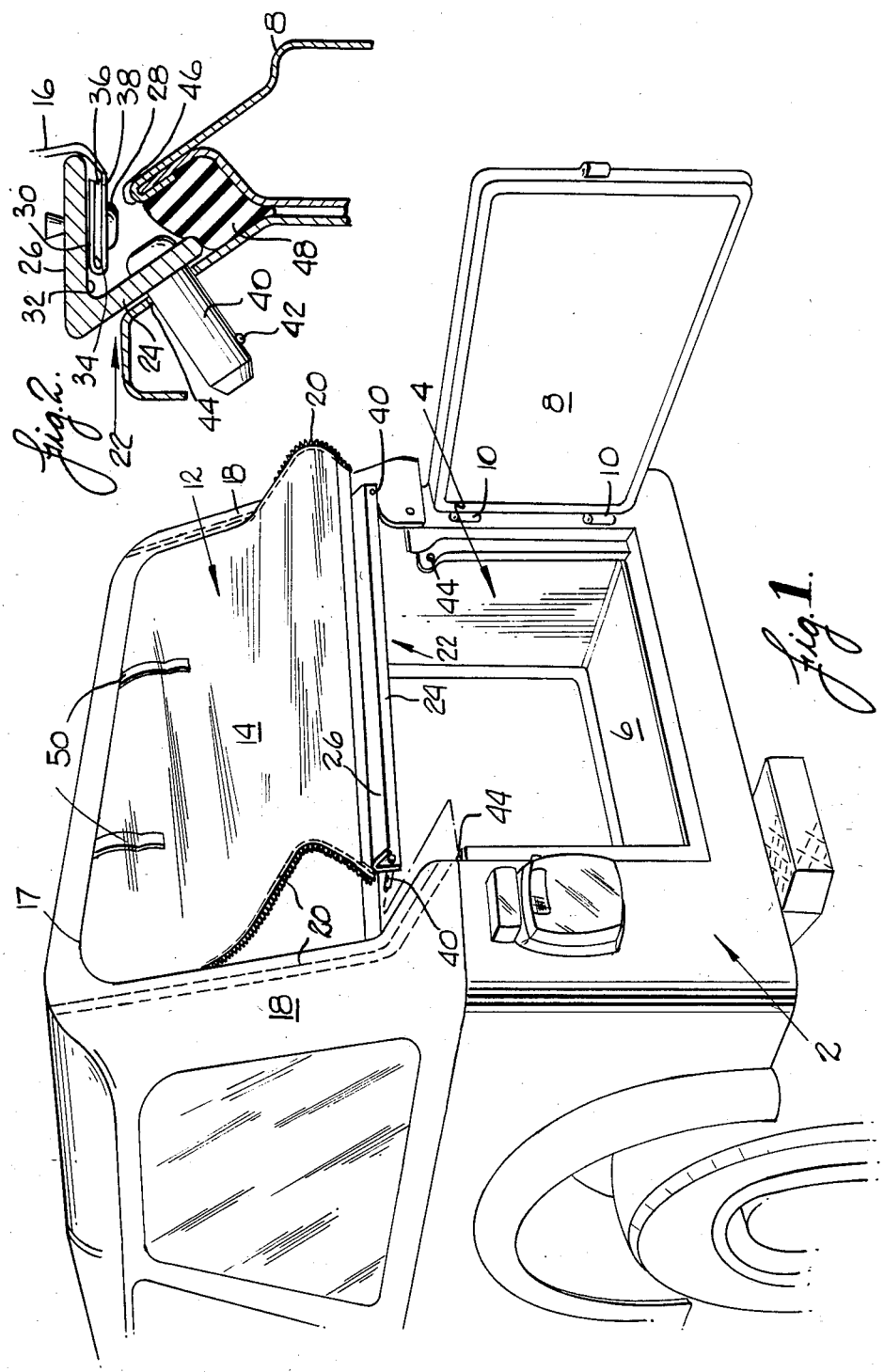

JEEP TOP FASTENING MEANS

FIELD OF INVENTION

This invention relates to apparatus for covering and uncovering an access opening in an automobile body and is particularly related to apparatus for covering and uncovering an opening in the rear of an automobile body so that objects may be inserted through the access opening into the automobile.

BACKGROUND OF THE INVENTION

For many years, the AMC Jeep has been manufactured with apparatus for covering and uncovering a rear access opening comprising a spare tire carrier, a tailgate and a flexible cover. The spare tire carrier was secured to the automobile body so that it pivoted around a vertical axis, and the tailgate was secured to the automobile body, independently of the spare tire carrier, and the tailgate pivoted about a horizontal axis. The flexible cover was secured to the automobile body and to the outside of the tailgate. In order to uncover the rear access opening, it was necessary to open the spare tire carrier, unsnap lower portions of the flexible cover, unzip a portion of the flexible cover, reach inside to open a latch and then open the tailgate. Therefore, it was most desirable to provide a more efficient apparatus for covering and uncovering the rear access opening.

SUMMARY OF THE INVENTION

This invention relates to apparatus for covering and uncovering a rear access opening in an automobile body and in particular a rear access opening in an AMC Jeep. The apparatus comprises a tailgate for covering and uncovering the lower portion of the rear access opening and on which tailgate the spare tire is secured and a separate flexible member, not connected to the tailgate, for covering and uncovering the remaining portion of the rear access opening. The separate flexible member is secured to the top and side curtains by means which permits the movement of the tailgate to cover or uncover the lower portion of the rear access opening without moving any portion of the separate flexible member.

The separate flexible cover is provided with means for covering and uncovering the remaining portion of the rear access opening which means is only available when the tailgate has been moved to uncover the lower portion of the rear access opening. In the preferred embodiment of the invention, the separate flexible member comprises a sheet of transparent material having an opaque border secured to the bottom side thereof. One side of the opaque border is secured to a rigid elongated member which is provided with means for releasably securing the rigid elongated member to the automobile body. The major portion of the transparent material is releasably secured to the side curtains with a zipper. In some instances, it may be desirable to have an opaque border material completely surrounding the transparent material.

It is an object of this invention to provide apparatus for covering and uncovering an access opening for an automobile body.

It is another object of this invention to provide apparatus for covering and uncovering an access opening in an automobile body wherein the apparatus comprises two separate members.

It is a further object of this invention to provide apparatus for covering and uncovering an access opening for an automobile body wherein the apparatus comprises two separate members and wherein one of the members must be moved to the uncovered position before the other member can be moved to an uncovered position.

Other objects and advantages of the invention will be apparent from the following more particular description of preferred embodiments as illustrated in the accompanying drawing in which like reference characters refer to the same parts throughout the various views. The drawing is not necessarily to scale, emphasis instead being placed upon illustrating the principles of the invention.

BRIEF DESCRIPTION OF THE DRAWING

FIG. 1 is a pictorial view of the invention; and

FIG. 2 is a view in cross section illustrating a portion of the invention in a covered position.

DETAILED DESCRIPTION OF THE INVENTION

In FIG. 1, there is illustrated a portion of an automobile body, i.e., the rear 2 of an automobile body. An opening 4 is provided in the rear 2 so that objects may be moved through the opening 4 and positioned on the floor 6. A tailgate 8 is pivotally mounted by suitable means 10 on the rear 2 so that the tailgate 8 pivots around a vertically extending axis to a position to cover or uncover the lower portion of the opening 4. A spare tire (not shown) is mounted on the outer side of the tailgate 8 and moves with the tailgate.

A flexible cover 12 is used to cover or uncover the remaining portion of the opening 4. In the preferred embodiment of the invention, the flexible cover 12 comprises a transparent panel 14 having an opaque border material 16 secured to the bottom side of the transparent panel 14. The transparent panel 14 may be formed from any suitable material, such as a clear pressed vinyl, and the opaque border material 16 may be formed from any suitable material, such as a vinyl coated fabric. If desired, the flexible cover 12 may be completely opaque. The flexible cover 12 may be secured to the rear 2 by any suitable means that is readily removable so as to be able to cover or uncover the remaining portion of the opening 4. In the preferred embodiment, the flexible cover 12 is secured to the top 17 by any suitable means, such as stitching and to the side curtains 18 by two zippers 20 secured to the two sides of the transparent material 14 and the adjacent areas of the side curtains 18.

The lowermost portion of the opaque border material 16 is secured to a rigid elongated strip of material 22. The rigid strip of material is formed from a suitable material such as steel but may be formed from other materials having similar physical characteristics, such as plastic. In the preferred embodiment of the invention, the rigid elongated strip of material 22 has integral sides 24 and 26 disposed relative to each other so as to form an angular relationship therebetween. The lowermost portion of the opaque border material 16 is secured to side 26, as illustrated in FIG. 2, using rivets 28. The edge 30 of the lowermost portion of the opaque border material 16 is positioned between the surface 32 of the side 26 and the surface 34 of a flat strip 36 of rigid material with a portion of the opaque border material 16 covering the surface 38 of the flat strip 36. Rivets 28 are then used to secure the lowermost portion of the opaque border material 16 and the rigid flat strip 36 to the rigid strip of material 22.

Suitable means are provided to mount the rigid strip of material on the rear 2 of the automobile. In the preferred embodiment of the invention, a pin 40 having a ball detent 42 is secured to the side 24 adjacent to each extremity of the side 24. Openings 44 are provided in each side of the rear 2 adjacent to the opening 4 and each of the openings 44 are shaped to receive each pin 40 and retain each pin 40 in the associated opening 44 using the ball detent 42.

In FIG. 2, the flexible cover 12 and the tailgate 8 are shown in a position covering the opening 4. As illustrated, the side 26 extends outwardly over the top edge 46 of the tailgate 8 so as to provide protection from the elements. The angular relationship of the sides 24 and 26 provides for this protection. In the preferred embodiment of the invention, this angular relationship is about 60 degrees but other angular relationships may be used to obtain this protection. An elongated sealing member 48 is secured to the tailgate 8 so as to provide a seal between the tailgate 8 and the side 24 of the rigid strip of material 22. The elongated sealing member 48 may be shaped so that it is also in sealing engagement with a portion of the rear 2 of the automobile body. The seal can be formed from any suitable materials, such as a closed cell neoprene or other similar materials.

The operation of the invention will be described starting from the covered position illustrated in FIG. 2. The tailgate 8 is opened by suitable latching means (not shown) secured to the tailgate and the rear 2 of the automobile body and is pivoted around the means 10 so as to uncover the lower portion of the opening 4. If the objects to be positioned on the floor 6 can be inserted through the lower portion of opening 4, they are positioned on the floor 6 and the tailgate is pivoted back to the covered position. If the objects to be positioned on the floor 6 are larger than the lower portion of the opening 4, the flexible cover is moved to uncover the remaining portion of the opening 4. With the tailgate in the uncovered position, the rigid strip of material 22 is grasped and a force is exerted thereon to overcome the force of the ball detents 42 and pull the pins 40 out of the openings 44. The zippers 20 are opened so that the flexible cover may be moved to uncover the remaining portion of the opening 4. In some instances, it may be desirable to operate the automobile with the remaining portion of the opening 4 uncovered. In such instances, the rigid strip of material 22 is rotated so as to roll the flexible cover 12 thereon. When the flexible cover 12 has been rolled over the rigid strip of material 22, it may be secured in a position inside of and adjacent to the top of the automobile by the straps 50. The tailgate 8 is then moved to cover the lower portion of the opening 4.

While the preferred embodiments of the invention have been illustrated and described herein, it may be otherwise embodied and practiced within the scope of the following claims.

What is claimed is:

1. Apparatus for covering and uncovering an access opening in the rear of an automobile body comprising:
    a tailgate for covering and uncovering the lower portion of an access opening in the rear of an automobile body;
    a separate flexible member, not connected to said tailgate, for covering and uncovering the remaining portion of said access opening;
    said flexible member comprising a flexible pannel having a portion secured to the top and side curtains of said automobile and a rigid elongated member secured to said flexible panel in such a position that a portion of said rigid elongated member lies between said rear of said automobile body and said tailgate when said separate flexible member and said tailgate are in a position covering said access opening; and
    means for permitting the movement of said taligate to cover or uncover said lower portion of said access opening without moving any portion of said separate flexible member so that objects may be inserted through said lower portion of said access opening into said automobile body.

2. Apparatus as in claim 1 and further comprising:
    means for mounting said tailgate to said body so that said tailgate pivots around a vertical axis when moving to cover or uncover said lower portion of said access opening.

3. Apparatus as in claim 2 and further comprising:
    means for permitting the movement of said separate flexible member to cover or uncover said remaining portion of said access opening; and
    said means for permitting the movement of said separate flexible member being accessible only when said tailgate has been moved to uncover said lower portion of said access opening.

4. Apparatus for covering and uncovering an access opening in the rear of an automobile body comprising:
    a tailgate for covering and uncovering the lower portion of an access opening in the rear of an automobile body;
    a separate flexible member, not connected to said tailgate, for covering and uncovering the remaining portion of said access opening;
    said flexible member comprising a flexible panel having a portion secured to the top and side curtains of said automobile and a rigid elongated member secured to said flexible panel in such a position that a portion of said rigid elongated member lies forward of said tailgate when said separate flexible member and said tailgate are in a position covering said access opening;
    means for releasably securing said rigid elongated member to said rear of said automobile body; and
    means for permitting movement of said tailgate to cover or uncover said lower portion of said access opening without moving any portion of said separate flexible member so that objects may be inserted through said lower portion of said access opening into said automobile body.

5. Apparatus as in claim 1 wherein said rigid elongated member comprises:
    a strip having angularly related sides.

6. Apparatus as in claim 5 wherein:
    one of said sides overlies the top edge of said tailgate when said separate flexible member and said tailgate are in a position covering said access opening.

7. Apparatus as in claim 6 and further comprising:
    a sealing member secured between said tailgate and said rear of said automobile and contacting a portion of the other of said sides when said tailgate is in a position covering said lower portion of said access opening to form a seal between said tailgate and said rigid member.

8. Apparatus as in claim 7 wherein said means for releasably securing said rigid member to said rear of said automobile body comprises:
   a pin secured adjacent to each end of said other of said sides;
   spaced apart openings in said body adjacent to said access opening; and
   ball detent means in each of said pins so that said pins may be inserted into said opening and retained therein by said ball detent means.

9. Apparatus as in claim 8 wherein said flexible panel comprises:
   a sheet of transparent material; and
   a border of opaque material secured to at least the bottom side of said sheet of transparent material.

10. Apparatus as in claim 8 and further comprising:
    means for releasably securing a major portion of the perimeter of said flexible panel to said side curtains.

11. Apparatus as in claim 10 wherein said means for releasably securing a major portion of the perimeter of said flexible panel to said side curtains comprises:
    zippers.

12. Apparatus as in claim 8 wherein:
    said flexible panel is secured to said one side of said rigid elongated member.

13. Apparatus as in claim 12 wherein:
    said flexible panel is secured to the surface of said one side of said rigid elongated member adjacent to said top edge of said tailgate when said tailgate and said flexible member are in a position covering said access opening.

14. Apparatus as in claim 13 wherein:
    said angularly related sides are at an angle of about 60 degrees.

15. Apparatus as in claim 13 wherein:
    said flexible panel is opaque.

16. Apparatus as in claim 13 wherein:
    the width of said rigid elongated member is less than the width of the major portion of said flexible panel.

17. Apparatus as in claim 13 wherein said flexible panel comprises:
    a sheet of transparent material; and
    a border of opaque material secured to at least the bottom side of said sheet of transparent material.

18. Apparatus as in claim 17 and further comprising:
    means for releasably securing a major portion of the perimeter of said transparent material to said side curtains.

19. Apparatus as in claim 18 wherein said means for releasably securing a major portion of the perimeter of said transparent material to said side curtains comprises: zippers.

20. Apparatus as in claim 19 wherein:
    the width of said elongated member is less than the width of the major portion of said flexible panel.

21. Apparatus as in claim 1 further comprising means for releasibly securing said rigid elongated member to said rear of said automobile body in such a position that a portion of said rigid elongated member extends outwardly over said tailgate when said separate flexible member and said tailgate are in a position covering said access opening to provide protection from the elements.

22. Apparatus as in claim 1 wherein said strip is metal.

* * * * *